United States Patent [19]
Saurenbach et al.

[11] Patent Number: 5,715,054
[45] Date of Patent: Feb. 3, 1998

[54] SCANNING FORCE MICROSCOPE WITH DETECTOR PROBE FOR THE ATOMIC RESOLUTION OF A SURFACE STRUCTURE

[75] Inventors: Frank Saurenbach, Henzogenrath; Hans-Achim Fuss, Jülich, both of Germany

[73] Assignee: Forschungzentrum Jülich GmbH, Jülich, Germany

[21] Appl. No.: 669,604

[22] Filed: Jun. 24, 1996

[30] Foreign Application Priority Data

Dec. 24, 1993 [DE] Germany .................. 43 44 499.7

[51] Int. Cl.⁶ .................................................. G01B 9/02
[52] U.S. Cl. ...................................... 356/345; 356/357
[58] Field of Search ................................ 356/345, 351, 356/357, 358, 352

[56] References Cited

U.S. PATENT DOCUMENTS

| | | | |
|---|---|---|---|
| 5,206,702 | 4/1993 | Kato et al. .......................... | 356/358 |
| 5,227,857 | 7/1993 | Kersey . | |

FOREIGN PATENT DOCUMENTS

| | | | |
|---|---|---|---|
| 0 361 932 | 4/1992 | European Pat. Off. . | |
| 5-079834 | 3/1993 | Japan . | |
| 1315793 | 6/1987 | U.S.S.R. ............................ | 356/345 |

OTHER PUBLICATIONS

"Surace Profilometer With Ultra–High Resolution", IBM Technical Discloaure Bulletin, vol. 35, No. 3, Aug., 1992.

M.J. Offside, et al., "Interferometric Scanning Optical Microscope For Surface Characterization", Applied Optics, vol. 31, No. 31, Nov., 1992.

M. Nonnenmacher, "Force Microscopy With Actively Stabilized Differential Fiber Detection Mechanism", *Journal of Vacuum Science & Technology*, Jul./Aug. 1993, No. 4, Part 1.

*Primary Examiner*—Samuel A. Turner
*Attorney, Agent, or Firm*—Klaus J. Bach

[57] ABSTRACT

In a scanning probe microscope for the atomic resolution of the surface structure of an object wherein a detector probe is supported on a sensor head by a probe holder so as to be movable relative to the surface of an object to be scanned, the sensor head includes a first light conductor with an end face disposed opposite the detector probe and a second light conductor having an end face disposed opposite the object surface and an interferometer is connected to each light conductor for determining the distance between the first light conductor and the detector probe and, respectively, between the second light conductor and the object surface and an indicating instrument is provided which indicates the combined signal in such a way that the structure of said object surface is given independently of changes in distance between the sensor head and the object.

3 Claims, 2 Drawing Sheets

Distance of the Leafspring from the Glass Fiber

SCANNING FORCE MICROSCOPE WITH DETECTOR PROBE FOR THE ATOMIC RESOLUTION OF A SURFACE STRUCTURE

This is Continuation-in-Part application of International patent application PCT/DE94/01508 filed Dec. 20, 1994 and claiming the priority of German application P 43 44 499.7 of Dec. 24, 1993.

BACKGROUND OF THE INVENTION

The present invention resides in a scanning force microscope with a detector probe for the scanning force microscopy of the surface structure of objects by means of a probe having an atomic resolution. The probe is mounted on a probe holder and is moved relative to the surface being scanned. During the scanning, a signal characteristic of the surface structure is generated which is transmitted to a recording and displaying device for reproduction.

Scanning probe microscopy processes, particularly scanning tunneling or scanning force microscopy processes, are known in the art. The scanning tunneling microscopy utilizes, for the determination of atomic surface structures, the so-called tunnel effect; in the scanning force microscopy, local changes of the van der Waals forces or of the magnetic or electromagnetic forces are determined for the determination of atomic surface structures. In both cases, probe tips (scanning needles) are utilized for the detection and their movement during the scanning of the surface of the object to be analyzed is measured.

In the scanning tunneling microscopy, the probe movement is achieved by maintaining the tunnel current between the probe tip and the surface of the object at a constant value; in the scanning force microscopy, the movement of the probe is caused by the effects of the given van der Waals forces or the magnetic or electrostatic forces effective on the probe tip.

For sensing the movement of the probe tip, highly sensitive detection arrangements such as glass-fiber interferometers (Fabri-Perot interferometers) are known which utilize laser light inference by which distance changes of less than 0.01 nm can be measured. As conductors for the laser light beam, glass fibers are utilized herein which are interconnected with bi-directional monomode fiber couplers in such a way that the laser light is conducted to the scanning probe tip by way of the coupler. At the end of the glass fiber, the light beam is divided into a first beam part which is reflected at the interface between the glass fiber and the air and a second beam part which exits the glass fiber and reaches the probe surface from which it is reflected. The glass fiber and probes are so oriented with respect to each other that the second beam part reflected from the probe surface is returned to the glass fiber and interferes therein with the first light beam part reflected from the end face of the glass fiber. The interference signal generated in this manner is utilized as a measure for the distance between the end of the glass fiber and the reflective probe surface.

The interferometric measurement of the distance changes and the movement of the probe tip provides for a high resolution. However, the quality of the resolution may be detrimentally affected by small disruptive vibrations as caused by mechanical vibration of the probe holder and by vibrations of the objects to be scanned or by a differing temperature drift. So far, it has been tried to minimize such disturbances by expensive vibration isolation structures and by a compact scanning probe microscope design. But, especially suddenly occurring air vibrations such as disturbances caused by the sound of steps cannot be sufficiently well eliminated in this manner.

It is the object of the present invention to provide a measurement procedure for the scanning probe microscopy which eliminates errors generated by unavoidable disruptive vibrations and by a temperature drift between the probe and the object to be scanned.

SUMMARY OF THE INVENTION

In a scanning probe microscope for the atomic resolution of the surface structure of an object wherein a detector probe is supported on a sensor head by an probe holder so as to be movable relative to the surface of an object to be scanned, the sensor head includes a first light conductor with an end face disposed opposite the detector probe and a second light conductor having an end face disposed opposite the object surface and an interferometer is connected to each light conductor for determining the distance between the first light conductor and the detector probe and, respectively, between the second light conductor and the object surface and an indicating instrument is provided which combines the signals in such a way that the structure of said object surface is indicated independently of the distance of the probe detector from the object surface.

Advantageously, this procedure is utilized particularly where the probe of the scanning force microscope and the object to be checked are independently supported, that is, where the probe and the object are movable relative to one another, that is where the probe and the object can be moved relative to one another when disruptive vibrations or temperature drifts occur.

Suitably, as a disturbance signal a signal is used, which registers the relative movement between the probe holder and the object being scanned and this signal is superimposed on the measurement signal provided by the probe in such a way that only the signal characterizing the surface structure is indicated. Advantageously, this process is employed particularly where the probe of the scanning probe microscope and the object to be scanned are independently supported, that is, where the probe and the object can move independently from one another when disturbing vibrations or temperature drifts occur. It is appropriate to use as a disturbance signal, a signal which does not resolve the surface structure to be determined and to utilize the signal as a measurement value, which is independent of the surface structure signal. A disturbance signal of this type can be superimposed onto the signal provided by the probe in a simple manner in such a way that the surface structure signal of the object being scanned is prominent. Preferably, the relative movement between the probe and the object being scanned is measured by interferometric intensity changes of a laser beam. If the surface structure of the object is already determined by interferometric means, the interferometric determination of the relative movement between the probe and the object to be scanned should be separately accomplished. The two optical signals can be transformed into electronic signals which are then supplied to a recording apparatus which develops the structure signal and indicates it. However, an interferometric switching arrangement for the optical signals may be provided whereby the surface structure signal alone is electronically transformed.

Below, the invention and some embodiments thereof are described in greater detail on the basis of a suitable scanning probe microscope the figure is a schematic representation of an exemplary embodiment of the scanning probe microscope.

DESCRIPTION OF PREFERRED EMBODIMENTS

Figure 1:
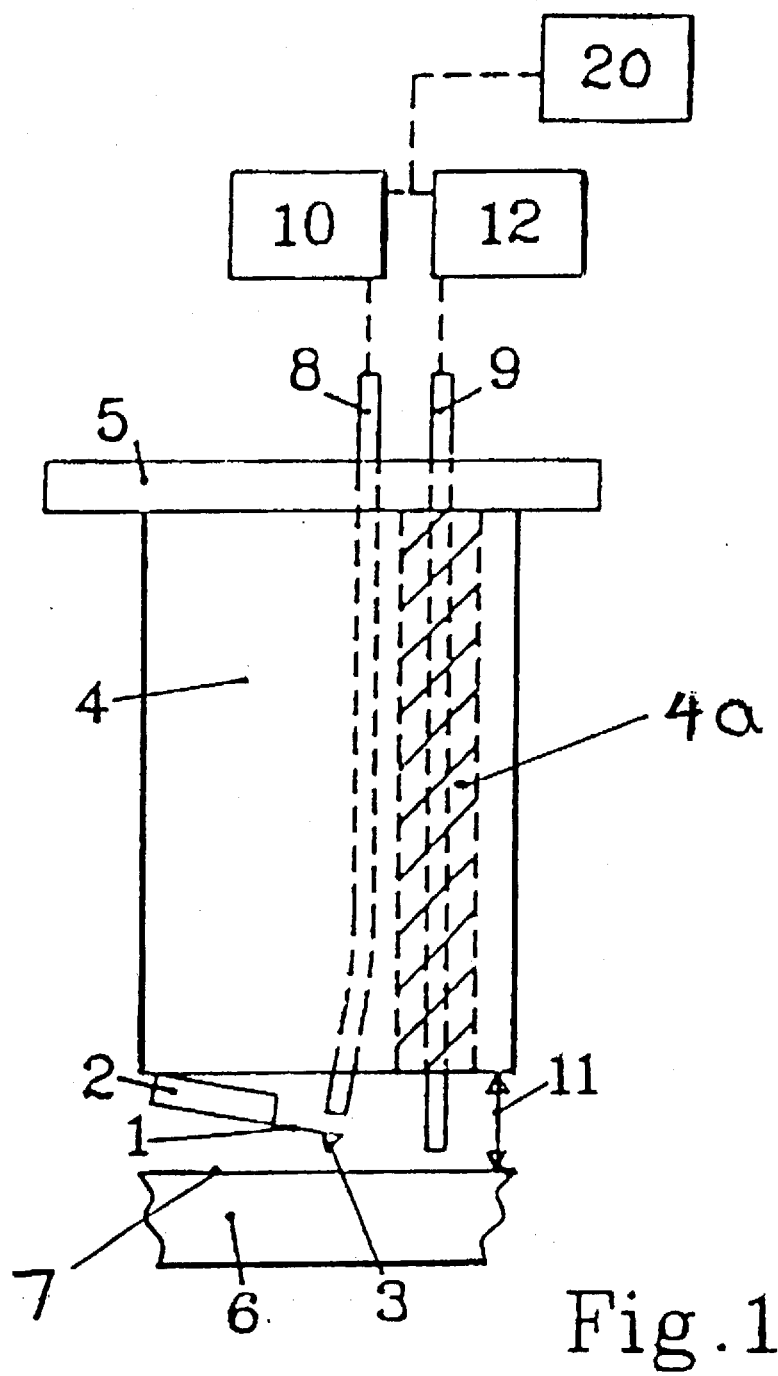
FIG. 1 shows an interferometric scanning probe microscope.

FIG. 1 shows, schematically, as a scanning probe microscope, a scanning force microscope which comprises a leaf spring 1 having one end firmly and rigidly connected to a probe holder 2 and carrying at its other, movable free end, a probe tip which serves as a detector probe 3 indicated in the drawing schematically. The probe holder 2 is mounted on a sensor head 4 which is movable relative to an object 6 to be scanned by means of a microscope bridge 5. During scanning the detector probe 3 is moved across the surface 7 of the object 6 without contacting it whereby the leaf spring 1 is deflected dependent on the forces effective on the detector probe 3 at the surface 7 of the object (Van Der Waals forces, magnetic, or electrostatic forces). In the embodiment shown in FIG. 1, the deflection of the leaf spring 1 and the position of the microscope bridge 5 in relation to the object 6 are interferometrically determined. For this purpose, the sensor head 4 includes a first glass fiber 8 and a measuring head 4a, which, like the sensor head 4, is firmly mounted on the microscope bridge 5 and which includes a second glass fiber 9 serving as a light beam conductor. In the embodiment as shown, the laser light beam transmitted through the glass fiber 8 is utilized to determine the leaf spring deflection during movement of the detector probe 3 (scanning) over the object surface 7. The glass fiber 8 ends therefore at a predetermined distance from the leaf spring 1 so that a laser light beam part exiting the glass fiber 8 strikes the mirror-like surface area on the back side of leaf spring where it is reflected and directed back into the glass fiber 8. The laser light beam part reentering the glass fiber 8 interferes, within the glass fiber 8, with a laser light beam part which is reflected at the glass fiber end by the interface between the glass fiber end face and the air. The interference value resulting from the interference of the two laser light beam parts is utilized as a measure for the distance between the glass fiber end face and the leaf spring surface. A change in the spring deflection results in a corresponding change in the interference, that is, a change in interference indicates a change of the spring deflection. In the embodiment as shown in FIG. 1, the glass fiber 8 is connected to an interferometer 10 which determines the interference value.

The second glass fiber 9 arranged in the embodiment of FIG. 1 in the measuring head 4a receives a laser light beam for determining the position of the microscope bridge 5, that is, the measuring head 4a relative to the object surface 7. For this purpose, the glass fiber 9 ends at a predetermined distance above the object surface 7 so that of a laser light beam conducted through the glass fiber 9, a part exits the glass fiber end and is reflected at the object surface 7 back into the glass fiber 9. The light beam part reflected into the glass fiber 9 interferes in the glass fiber 9 with the light beam part reflected at the glass fiber/air interface, the resulting interference value indicating the position of the measuring head 4a that is its distance 11 from the object surface 7. The glass fiber 9 is connected to a second interferometer 12 by which the resulting interference value is measured as a distance value.

If the distance 11 between the sensor head 4 and the object surface 7 remains constant during the scanning movement of the detector probe 3, the interference value determined by the interferometer 12 will also remain the same. Then the interference value determined by the interferometer 10 reflects exactly the deflection of the leaf spring 1 caused by the forces acting on the detector probe at the object surface 7. Every change of the interference value represents topographic changes at the object surface or changes of the magnetic or electrostatic domain.

If, during scanning movement, a disturbance occurs by a relative movement between the microscope bridge 5 with the sensor and measuring heads 4 and 4a and the object surface 7, the interferometer 12 indicates a change of the interference value which is, at the same time, superimposed onto the interference value determined by the interferometer 10 so that again only the value is indicated which corresponds to the leaf spring deflection that is the configuration of the object surface 7. When the interferometer 12 measures an increase in the distance between the measuring head 4a and the object surface 7 the object surface 7 value as determined by the interferometer 10 is to be reduced by the increase in distance; when the interferometer 12 measures a decrease in the distance between the measuring head 4a and the object surface 7, the object surface 7 value as determined by the interferometer 10 is to be increased by the decrease in distance.

Figure 2:
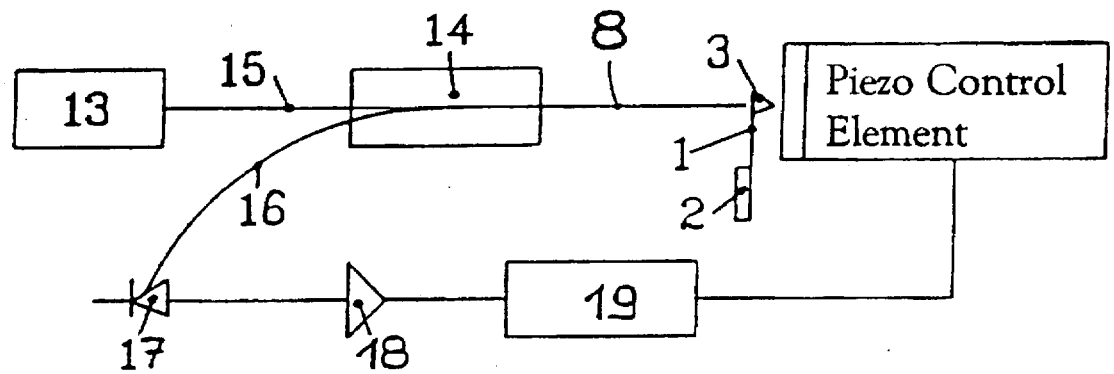
FIG. 2 shows an interferometer for a scanning probe microscope according to FIG. 1.

FIG. 2 shows schematically one of the interferometers 10, 12 specifically, the interferometer 10 of the embodiment shown in FIG. 1. The arrangement of the interferometer 10 corresponds essentially to that of a Fabri-Perot interferometer with which distance changes of less than 0.01 nm can be measured.

For the splitting of a laser light beam generated in a laser diode 13, a bi-directional 2×1 monomode fiber coupler 14 is utilized by way of which the laser light beam generated in the laser diode 13 is transmitted, via a glass fiber 15 and 8 to the light reflective back side of the leaf spring 1. However, part of the laser light is reflected at the end face of the glass fiber 8 so that only a part of the laser light beam arrives at the back side of the leaf spring.

In the PIN diode 17, the laser light signal is converted to an electrical signal and is normalized and amplified in a circuit element 18 (including a divider and an operational amplifier). The electrical signal received in this manner from the interferometer 10 is a measure for the distance between the end of the glass fiber 8 and the reflective backside of the leaf spring 1.

Figure 3:
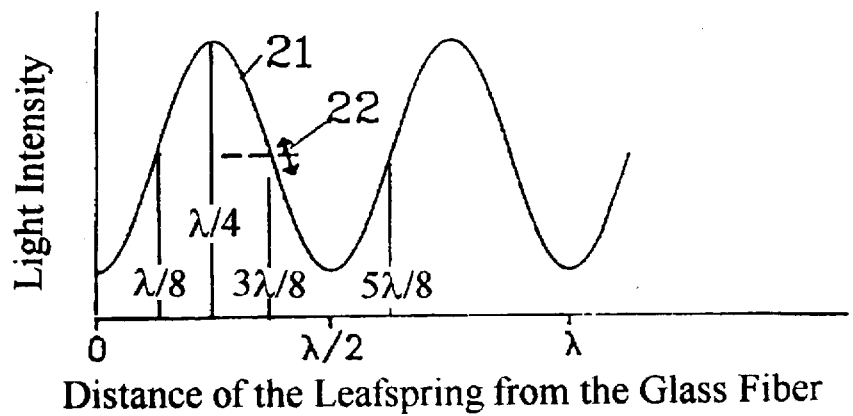
FIG. 3 is a diagram showing the light intensity depending on the distance between the light conductor (glass fiber) and the surface of the object whose position is measured.

Since the light intensity oscillates with a period of $\lambda/2$, when the leaf spring 1 moves relative to the end face of the glass fiber 8 the interference changes 21 can be detected in the most sensitive manner in the linear signal area 22 shown in FIG. 3. Therefore, controller 19 (PID controller) which is part of the interferometer 10 adjusts the average distance between the detector probe 3 of the leaf spring 1 and object surface 7 in such a way that the interference changes can be measured within the linear signal range 22.

the interferometer 12 used for determining the distance between the measuring head 4a and the object surface 4a has essentially the same configuration as the interferometer 10 shown in FIG. 2. Instead of the glass fiber 8, however, now the glass fiber 9 is connected to the interferometer 12.

The interference signal generated by the interferometer 12 is superimposed on (added to or subtracted from) the interference signal of the interferometer in such a way that only a signal equivalent to the object surface 7 is indicated by the indicating instrument 20 shown schematically in FIG. 1.

With the arrangement presented herein, there is no need to provide for a particular vibration isolation of the scanning probe microscope nor is there a need for a temperature compensation arrangement as the distance of the scanning probe from the object surface is automatically adjusted to an optimum value. The microscope arrangement and the procedure according to the invention can be utilized also for larger microscopes for the scanning of objects with large surface areas.

What is claimed is:

1. A scanning probe microscope for the atomic resolution of surface structure of an object, comprising: a sensor head, a probe holder mounted on said sensor head, a detector probe supported on said probe holder so as to be movable relative to said sensor head, means supporting an object with a surface to be scanned adjacent said detector probe, a first light conductor extending through said sensor head and having an end face disposed opposite said detector probe, a second light conductor extending through said sensor head and having an end face disposed opposite the surface of said object, a first interferometer connected to said first light conductor for providing a first signal corresponding to the distance of said detector probe from the end of said first light conductor, a second interferometer connected to said second light conductor for providing a second signal corresponding to the distance of said object surface from the end of said second light conductor and means combining said first and second signals so as to indicate the surface structures of said object surface independently of the distance of said sensor head from said object surface.

2. A scanning probe microscope according to claim 1, wherein said sensor head is mounted on a leaf spring which projects from said probe holder, said first signal being generated by the interference of first and second parts of a laser beam entered into said first light conductor and reflected from said leaf spring and the end surface of said first light conductor, said laser beam having a light intensity curve with minimum and maximum values and linear areas therebetween, and said sensor head is positioned relative to said object surface being scanned such that interference of said first and second laser light beam parts occurs in a linear area of the light intensity curve between its minimum and its maximum values.

3. A scanning probe microscope according to claim 1, further comprising a position controller for adjusting the position of said object relative to said sensor head and said detector probe, said second signal being generated by the interference of beam parts of a laser beam entered into said second light conductor and reflected from said object and the end surface of said second light conductor, said laser beam having a light intensity curve with minimum and maximum values and linear areas therebetween, and means for adjusting the distance of said object surface to be scanned from said sensor head such that interference of the beam parts in said second light conductor occurs in the linear area of the light intensity curve between its minimum and maximum values.

\* \* \* \* \*